United States Patent Office 2,969,039
Patented Jan. 24, 1961

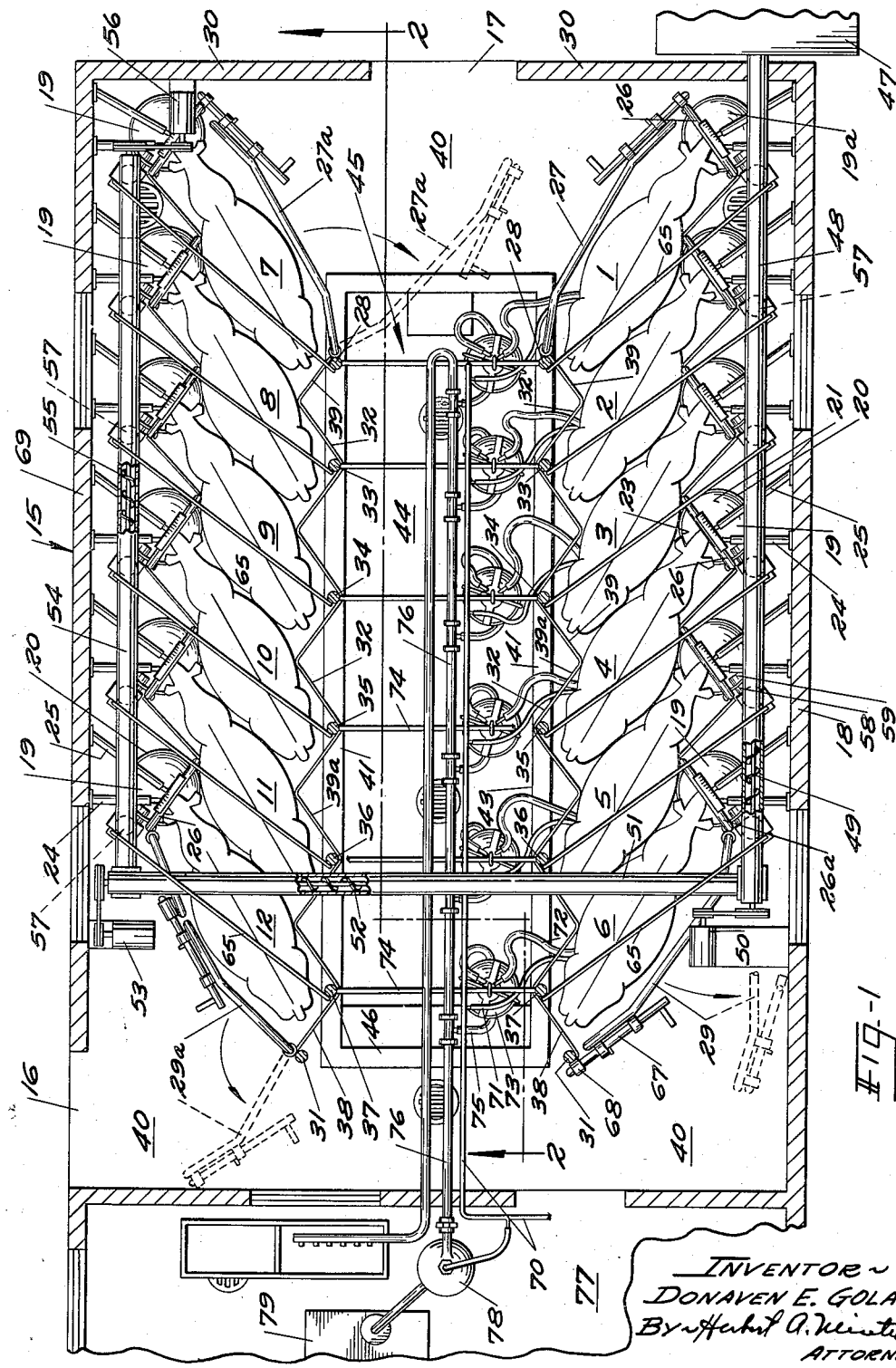

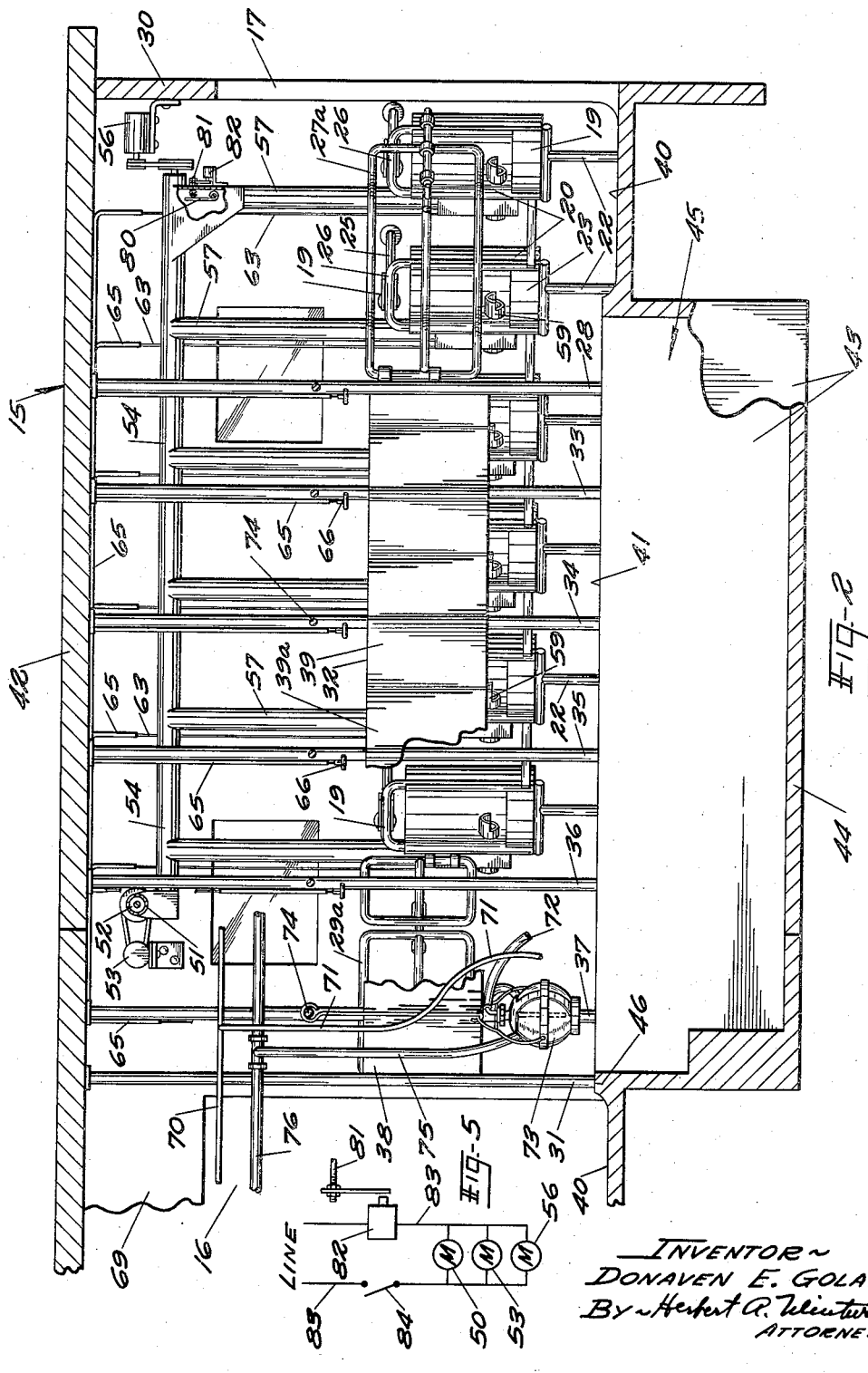

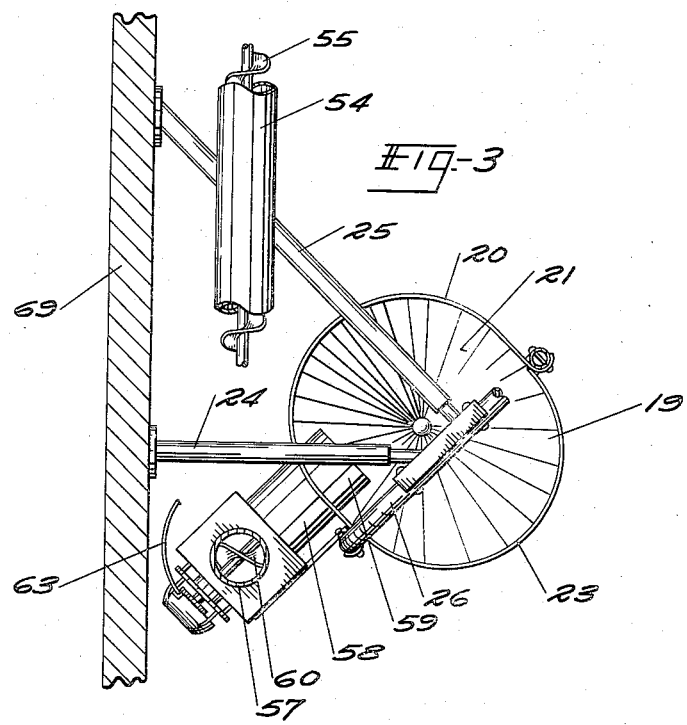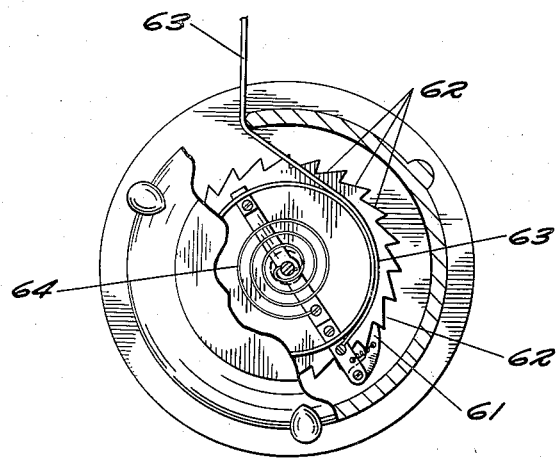

2,969,039

ECHELON MILKING SYSTEM

Donaven E. Golay, Cambridge City, Ind., assignor to Golay & Co., Inc., a corporation of Indiana Filed Dec. 26, 1957, Ser. No. 705,423

4 Claims. (Cl. 119—14.03)

The invention described and shown herein comprises a combination of elements brought together into a new system of batch or group handling of cows during milking operations.

It has long been known that cows are gregarious in habits and when handled, are generally contented when handled in groups or batches wherein each individual cow is allowed to continue her association with other cows and that individual cow is not attempted to be handled separately and removed from the group.

In structures heretofore known for handling cows during milking operations, cows have been brought together to stand in spaced, side by side relation, in barns wherein the cows are generally parallel one with the other and each cow is separately held by having a stanchion engaging about her neck so as to limit the fore and aft movement of each cow, and each cow was aligned along a more or less continuous manger in which ground feed and hay would be fed. The milking operator was obliged to stand between the hips of adjacent cows in order to reach the udder of the cow to be milked to milk her either by hand or to attach the teat cups for a mechanical milker. This generally meant that one cow had to be pushed sideways from the other cow in order to permit the entrance of the operator therebetween.

Such a system was quite time consuming, and then there evolved the so-called "parlor" system of milking whereby a single cow would be brought into a compartment and there restrained by closing a gate either at the side of the cow or at the rear end in order to bring side restraining walls in close proximity with the sides of the cow and at the same time provide means for preventing fore and aft movement of the cow to any substantial degree. Then the operator would stand on a level below the level of the floor on which the cow stood in order to reach the udder of the cow readily and attach the teat cups of the milking machine. This has had a decided disadvantage in that it does not appeal to the temperament of the cow and she becomes restless and is required as a rule to be forced into the milking parlor, and even after she becomes accustomed to walking into the parlor of her own free will, she still has a more or less nervous reaction since she has been removed from her companion cows and is standing entirely alone. This results almost universally in a reduced flow of milk as opposed to the stanchion holding of the cows in side by side relation.

The milking parlor system did enable the operator to handle more cows within a given amount of time, but yet considerable time was consumed in having to handle the cows individually.

With the cost of feeds rising, labor cost rising, and milk prices remaining more or less fixed for a given season of the year, the dairyman was confronted with diminishing profits or no profits at all, seemingly without a solution to that difficulty.

In the present invention, which has been devised and conceived to permit one operator to handle a greater number of cows in a batch and to cater to the cow's own feelings of wanting to be with her well known associates, there is a floor, along one side of which is mounted a plurality of feed boxes and along the opposite side a series of "splash guards" in effect limiting the open walking space between the feed boxes and the splash guards. At the far end of this area, there is a gate normally disposed in a closed position at an angle of thirty degrees in relation to the line of feed boxes, and extending from that line to the line of splash guards.

A second gate at the entering end of the area is initially opened, and a group of cows are allowed to come through that second gate and walk substantially single file across the area until the lead cow comes to the first gate. The feed box immediately adjacent that first gate will have been filled first to induce the lead cow to come to that position. The gate automatically positions that cow to approximately a thirty degree angle and approximate parallelism with the gate. Each feed box is then supplied with feed so as to induce the following cows to come one after another to the feed boxes, and if the first cow has not brought herself up into close proximity to the first gate, the second cow will tend to nudge her over so that she can reach her feed box, and that nudging-over action will take place down through the line of the cows, until each and all of the cows are then in substantially a thirty degree and parallel alignment one with the other.

The splash guards are so arranged that there will be a panel across the rear end of each cow reaching substantially over to the next adjacent cow, and terminating at a spaced distance above the floor constituting the area on which the cows are standing. Once the cows are aligned as above indicated, the individual splash guards behind the cows will prevent the cows from backing up, and while the cows are free to move their heads and necks, they are not free to back up and neither do they have sufficient room to turn around. Yet one cow may press against another cow, and thereby fully realize that she is still in close association with a fellow member of her herd, and from that close association will remain content and will not be disturbed as she would have been had she been brought into the area and restrained there individually and far removed from other cows.

In this arrangement, each cow's udder is presented along the splash guard side of the area, and there is a sunken floor below the floor on which the cows stand, and it is on this sunken floor that the milking operator may walk and manipulate the mechanical milker so as to apply and detach the milking machine teat cups to and from the individual cows all without having to actually push one cow away from another or even stand between them. Of course the cows' udders may be thoroughly washed while in this "batch" relationship, and then the milking operation is conducted. The second gate will have been, of course, closed so as to maintain the last cow in the alignment in her thirty degree position. After the milking operation has been completed, on all of the cows brought in over the cow floor, the first gate will be opened to allow the first cow or the lead cow to turn her head and walk naturally away from that original area without having to turn around or to have to back up, so that she is free to go and the other cows are free to follow her.

While reference has been made to the single floor area, and this area may be used in a large number of instances, particularly where the dairy herd is not too large, the same arrangement can be had on the opposite side of the sunken floor so that two batches of cows may be brought in to have their udders presented along opposite sides of the sunken floor area so that the operator may handle the additional number of cows.

Heifers and nervous cows are readily quieted by the company and contact with other cows, so that they are quickly adjusted to this routine of being handled in batches. Moreover since their heads are turned away from the milking area where the operator is moving about, they cannot see what is going on in the operator's space, and are usually so busy eating the feed that they pay no attention to anything else, as long as they can actually feel contact with the other cows.

Another essential feature and advantage of this present invention is that normally where cows are separated for the milking operation, they become so nervous that they will unduly soil the milking area and cause a general unsanitary condition to arise. In using the present invention, the nervous system of the cow is so allowed to remain at the normal level that there is relatively very little soiling, and what few droppings do occur, may be quickly washed down a drain by a hose operated by the operator while standing in his area over the sunken floor.

This invention presents an advance in dairy farm mechanization beyond what has heretofore been possible, and it utilizes the modern industrial principle of bringing the work to the operator, cutting the operator's steps to the absolute minimum and reducing the time of operations which are concentrated to putting teat cups on the cows and taking them off. The system enables one man to milk three times as many cows at least in the same length of time as he can with pail milking machines, and then if the pipe line system is employed, with the milkers, an additional time is saved. By employing two rows of cows with the sunken floor between, a one man operation would consist of equipment for ten to twelve cows, five to six in each row and five to six milker units so that each unit may be used to milk a cow in each group. This is accomplished by switching the teat cups across the sunken floor from one side to the other.

With the foregoing in mind, one particular form of the invention is described in detail in reference to the accompanying drawings, in which—

Fig. 1 is a view in top plan and partial section of an installation of a structure embodying the invention;

Fig. 2 is a view in vertical section on the line 2—2 in Fig. 1;

Fig. 3 is a detail in top plan view and partial section of the feed box feeding mechanism;

Fig. 4 is a detail on an enlarged scale of the ratchet means for rotating the feed auger; and Fig. 5 is a wiring diagram of a feed control circuit.

The invention is herein shown and described in reference to the "two row" installation although, as above indicated, the invention is applied in its fundamental form to a single row installation.

A building generally designated by the numeral 15 is provided with an inlet door opening 16 and an outlet door opening 17.

Along the wall 18 there are feed boxes 19 each fixed into positions centered on a common line parallel with the wall 18. Each of these boxes 19 comprises a semi-cylindrical wall 20 extending upwardly from the bottom 21 which is spaced above the floor by any suitable means, herein shown as being supported by a post 22. Across the front or side presented toward the cow is a short length of an enclosing wall 23. Suitable frame members 24 and 25 interconnect with an inverted U-shaped member 26 along the sides of which terminate the vertical edges of the wall 20. The structure and mounting of the feed box 19 in each instance is described more in detail in an application for U.S. Letters Patent filed herewith. The members 26 are mounted each at an angle of approximately forty-five degrees with the wall 18.

A gate 27 is hingedly mounted on a post 28, and the major length of the gate 27 is positioned at substantially thirty degrees to the wall 18, when it is in a closed position, along the outer side of the first frame 26.

There is a second gate 29 hinged on the frame member 26a of the feed box 19 at its position farthest removed from the building end wall 30. This gate 29 is normally positioned by its major length portion swinging from the frame 26a to be parallel to the gate 27 when the gate is in a closed position determined by a vertical post 31.

A zig-zag splash guard is provided by fixing a V plate 32 between each of adjacent posts 28, 33; 33, 34; 34, 35; 35, 36; and 36, 37. There is a straight plate 38 fixed by its ends between the post 37 and the post 31.

Each of these V-plates 32 has a straight length portion 39 approximately thirty degrees to the wall 18. These plates 32 and the plate 38, are approximately in this one form of the invention twenty-two inches high, and the under edges of the plates are located in a common horizontal plane substantially twenty-five inches above the floor 40 of the building 15, the feed boxes 19 being supported above this floor 40.

The various posts 28—37 are in a common vertical plane as to their centering axes in relation to the wall 18, and these posts rise out of a curb 41 which would be normally about four inches high above the level of the floor 40. Preferably these posts will extend from the curb 41 to the ceiling 42 of the building 15.

The curb 41 is along the top of a wall 43, Fig. 2, which rises from an elongated well having a floor 44. This floor 44 is preferably at a distance of thirty inches below the tops of the floor 40.

So much of the structure defined will be employed for a single row of cows taking up to six in number. However where it is desired to have a double row, the same construction will be duplicated on the opposite side of the well generally designated by the numeral 45. The structure for the second row, being identical to that of the first row need not be further explained, the same numerals being applied to like elements. There is one difference however and that is that the angularity of the portions 39 of the splash guard V plates and of the feed box frames 26 are reversed as will become apparent in the following description.

Referring to the entry opening 16, and it being desirable to place cows in the row first described, the gate 29a of the second row will be closed to its solid line position. The gate 29 will be shifted in the direction of the arrow from its solid line position to the fragmentary dash line position. The cows may then be allowed to enter the building 15 through the opening 16, and by reason of the gate 29a being closed, and there being a cross curb 46 between the two side curbs 41 the cows will walk directly over the floor 40 and go through the open gateway 29 one after the other, the lead cow 1 going to the extreme end of the space to the feed box 19a. An inducement is provided to cause the cow 1 to go to this extreme position toward the end wall 30.

This inducement lies in the sequence of placing feed in the various feed boxes 19. In the form herein shown, there is provided a feed bin 47 from which leads a tube 48 carrying an auger 49 throughout its length from inside of the bin 47, this auger 49 being rotated selectively by means of a motor 50. A cross feed pipe 51 leads from the underside of the end of the pipe 48 farthest removed from the bin 47, carrying an auger 52 therein driven by a motor 53 simultaneously with the operation of the motor 50. This pipe 51 discharges by its end adjacent the wall 69 into a third pipe 54 which extends from under the pipe 51 toward the wall 30. There is an auger 55 in the pipe 54 driven by the motor 56 simultaneously with the other two motors 50 and 53. Substantially vertically disposed pipes 57 lead downwardly from the underside of the pipes 48 and 54 along the side of each of the feed bores 19, and at the lower ends of these pipes 57 there is a more or less horizontally disposed short pipe length into which the vertical pipes 57 discharge, these short lengths 58 each passing through the wall 20 of the feed box with a terminal end 59 extending therein. A short auger 60 is revolubly carried within each of the pipes 58, and is operated each individually by a ratchet mechanism through pulling and releasing a cable or cord 63, see Fig. 4. The cord 63 pulls a dog 61 against teeth 62 on a member fixed to the auger 60, and following the pull on the cable 63, a spring 64 returns the dog 61 around the teeth 62 for a subsequent engagement therebetween for further turning of the auger.

Therefore the cable 63 is carried upwardly and overhead preferably through any suitable guiding means such as by a tube 65 in each instance, and thence downwardly to either a common zone adjacent the curb 46, or individually to each of the posts 28, 33—37. The cable 63 is herein shown as coming downwardly from the overhead tube 65, so that there will be a terminal handle 66 at each of the posts indicated.

Thus to induce the cow number 1 to go to the feed box 19a, the handle of the cable 63 disposed at the post 28 will be pulled so as to turn the auger 60 and thus carry feed into the feed box 19a, the degree of pulling on the cable 63 and the number of times the auger is turned will give a predetermined amount of feed for that particular cow. Cow number 1 will go to that far box 19a by noticing that there is no feed in the preceding boxes. The frames 26 are of such width that the cow number 1 will assume the position indicated in Fig. 1, and then each next succeeding cow will come in along the side of the preceding cow nudging the cows over as they come into their own feed boxes which have been supplied with feed one after another as the cows approach the respective boxes 19. Eventually when all six cows have come to their respective feed boxes, the gate 29 is closed to the solid line position as indicated in Fig. 1, and latched into fixed engagement with the post 31 by any suitable means, herein shown as by a slide bar 67 entering an eye 68 on the post 31. The member 39 of each of the V plates 32 is so positioned that it will be immediately adjacent the rear end of each of the respective cows, the other plate 39a of the V plate 32 defining a portion which will extend along the hip portion of the cows number 2–6 as indicated in Fig. 1 so that the rear end of the cow cannot be shifted over toward the curb 41, and neither can the cows back up by reason of their rear ends coming into contact with the plates 39. The lengths of these elements 39a and 39 of the V plates 32 together with the widths of the frames 26 are made to be such that the cows will automatically align themselves to have the belly, that is the belly of number 2 cow come into alignment with the hip side of cow number 1 and so on down the line to cow number 6. This places the head of number 2 cow back of number 1 cow approximately thirty-one inches in measuring on the thirty degree line from the wall 18 or from the other side wall 69.

When cows 7–12 are to be admitted to the building 15 through the inlet doorway 16, the gate 29a is swung around to the dash line position while the door 27a remains closed, and the same feed placement in the succeeding feed boxes 19 is had as the cows enter between the splash guards and the feed boxes. While the cows 1–12 are eating, the milking operation is conducted by an operator standing on the floor 44 in the pit or well 45. Spaced above the pit 45 is a pulsated vacuum line 70 from which leads a flexible tube 71 to a claw (not shown) which carries the usual teat cups and is hung therefrom as the teat cups are attached to the teats of the cow's udder. For the twelve cows, there are six of these tubes 71 in the present installation, so that each of the six cows may be milked simultaneously, the teat cups of course being placed on the teats of each cow one after another as the operator progresses from one cow to the other. Milk is returned from the claw through a milk line 72 to a weigh jar which in this case is a spherical glass container 73, this jar being suspended from a cross bar or track 74 extending overhead of the operator from one side to the other of the pit 45. As soon as any one of the cows 1–6 has been completely milked, and when desired the quantity of milk in the weigh jar 73 is noted, the weigh jar is turned over and the milk in that jar is carried upwardly through a tube 75 which leads to a milk pipe line 76 under vacuum pressure so that atmospheric pressure will lift the milk into the pipe line 76, and then flow into a milk room 77 where it discharges through a collector 78 and through a vacuum line releasor (not shown) and finally into a milk tank 79 or into individual cans (not shown) as the system may require.

The details of the actual milking equipment do not enter into the present invention since this equipment is covered by other patents and applications for patents. Any other type of milking machine operation may be employed as may be selected although the system just indicated is one which presents the utmost in economy of operation and also in sanitation. When cow number 6 for example has been completely milked, and the milk in the weigh jar 73 has been evacuated, the milking equipment is shifted along the bar 74 to cow number 12, the milking operation is repeated, the same being true for each cow opposite the first line of cows 1–6. In this way, the operator may shift the machines without having to wait for the entire line of cows to be milked, making the shifting as each individual cow is milked, so that the time difference in slow milking cows and faster milking cows is somewhat equalized.

When the milking operation has been completed for this batch of twelve cows, first the door 27 on one side may be released and opened around so that cow number 1 for example may then be free to walk on around the floor 40 and out the outlet opening 17. In the same manner, cows 7–12 are released one after another so that no cow remains tied up in the line any place, but all are free to travel out one after another through the outlet opening 17 to again come into the herd assembly exteriorly of the building 15.

Thus it is to be seen that this parking of cows in a "packed" relationship places the cows not in the usual side by side relationship, but with each cow staggered so that the belly of one cow will be adjacent the hip of the next cow so as to bring the curve of her belly into nesting relation with the curve of the hip of the other cow. In this system, one operator can milk from fifty to sixty cows or even more per hour depending upon the efficiency of the operator and the training of the cows. Obviously the number of cows to be aligned in each row may be varied in accordance with conditions encountered on any particular dairy farm, but in the arrangement described, the greatest efficiency is had for a single operator. It also enables that operator to handle more milking units up to six as indicated than could be handled in the heretofore known arrangement.

In further respect to the feeding system, a safety stop feature is provided to prevent damage in case the feed conveyor auger 55 in the tube 54 continues operation when the tubes 57 become filled. In this event, feed will build up at the end of the tube 54 removed from the cross tube 51. This feed will push against a trigger 80 to cause it to press a rod 81 in turn operating a cut out switch 82 inserted in the line 83, Fig. 5, and thereby cause the motors 50, 53, and 56 to become deenergized. A main switch 84 normally closes a circuit to energize the motors.

Therefore while I have described my invention in the one particular form in minute detail, it is obvious that structural changes may be employed without departing from the spirit of the invention, and I therefore do not desire to be limited to that precise form beyond the limitations which may be imposed by the following claims.

I claim:
1. A milking pen structure for aligning and maintaining cows in side by side contacting relation free of intervening partitions and free of head restraining means, which structure comprises a pen floor having an area on which a plurality of cows may stand in echelon arrangement; said floor area being defined by a head zone along one side, a milking zone along the opposite side, an inlet end, and an outlet end; a plurality of feed boxes mounted along said head zone side of the floor, one box for each of said cows, and centered approximately along a straight line, a box being at each of said inlet and outlet ends; each of said boxes having an opening on one side away from said floor head zone; a plurality of spaced apart splash guards fixedly mounted along said milking zone side, one guard for each feed box; each guard being spaced from a feed box approximately at right angles to and on a center line through said box opening to said guard and diagonally disposed over said floor; all of said center lines being approximately parallel and at acute angles to said feed box straight line in relation to said floor inlet end; an inlet gate hinged along a side of a feed box at the inlet end of said floor area; an inlet gate stop at the end of the splash guard at said inlet end; said inlet gate in closed position being in approximate parallelism with said center lines; an outlet gate hinged by one end at the end of a splash guard at said floor outlet end; an outlet gate stop at the outlet side of the feed box at said outlet end; said outlet gate, when closed, being in approximate parallelism with said inlet gate; a stop member interconnecting adjacent splash guards in each instance forming therewith a zigzag aligning device along said floor milking zone side, guard to stop member connections being in substantially straight lines; said structure being such in dimensions as will restrain said cows when on said pen floor, one for each feed box, in side by side, belly to flank contact, induced by closure of both said inlet and outlet gates, the rear ends of the cows being in close proximity to said splash guards with the cow heads entered through said box openings, and the cow rear ends being held by said members from shifting along said splash guards in a direction toward said floor outlet end.

2. The structure of claim 1, in which said splash guards and members extend to a height above said cows and are spaced above said floor milking zone side, providing access therebetween to the udders of the cows.

3. The structure of claim 1, in which said splash guards and said members are of equal heights in solid sheet form, one guard and one member being integral in V-form.

4. The structure of claim 1 in which said acute angles of the center lines, and the closed gates are approximately thirty degrees each.

References Cited in the file of this patent

UNITED STATES PATENTS

| Re. 22,657 | Babson | Aug. 7, 1945 |
| 2,081,947 | McCornack | June 1, 1937 |
| 2,688,309 | Ferris | Sept. 7, 1954 |
| 2,740,377 | Duncan | Apr. 3, 1956 |

FOREIGN PATENTS

| 6,288 | Great Britain | Mar. 13, 1913 |